US007558899B2

(12) United States Patent
Yip (10) Patent No.: US 7,558,899 B2
(45) Date of Patent: Jul. 7, 2009

(54) DONGLE CONFIGURED TO ELECTRICALLY COUPLE A DATA STORAGE DEVICE AND A HOST COMPUTING DEVICE

(75) Inventor: Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 190 days.

(21) Appl. No.: 11/732,645

(22) Filed: Apr. 4, 2007

(65) Prior Publication Data

US 2008/0248672 A1    Oct. 9, 2008

(51) Int. Cl.
*G06F 13/00* (2006.01)
(52) U.S. Cl. .......................................... 710/300; 710/62
(58) Field of Classification Search ......... 710/300–308, 710/62–64, 72, 8–19; 439/353–359, 637–638
See application file for complete search history.

(56) References Cited

U.S. PATENT DOCUMENTS

| 6,843,674 | B1 * | 1/2005 | Young .......................... 439/248 |
| 6,908,330 | B2 * | 6/2005 | Garrett et al. ................ 439/378 |
| 6,950,859 | B1 | 9/2005 | Bartek et al. |
| 6,978,163 | B2 | 12/2005 | Dyer et al. |
| 7,134,908 | B2 * | 11/2006 | Wu ............................. 439/502 |
| 7,335,048 | B1 * | 2/2008 | Chen et al. ................... 439/358 |
| 2004/0259423 | A1 | 12/2004 | Elbaz et al. |
| 2005/0188224 | A1 | 8/2005 | Betts-LaCroix |
| 2006/0059289 | A1 | 3/2006 | Ng et al. |
| 2006/0161716 | A1 * | 7/2006 | Lin ............................. 710/313 |
| 2006/0185020 | A1 | 8/2006 | Levy |
| 2006/0203842 | A1 | 9/2006 | Wollmershauser et al. |
| 2006/0276083 | A1 * | 12/2006 | Sun ............................. 439/638 |
| 2007/0030517 | A1 | 2/2007 | Narayanan |
| 2007/0197100 | A1 * | 8/2007 | Tsao ........................... 439/638 |

OTHER PUBLICATIONS

"Novac USB to SATA Dongle," www.everythingusb.com/novac_usb-to-sata_dongle.html, Mar. 5, 2006, 2 pages.

* cited by examiner

*Primary Examiner*—Raymond N Phan
(74) *Attorney, Agent, or Firm*—Eric D. Levinson (57) ABSTRACT

A dongle is provided for coupling a data storage cartridge with a host computing device. The data storage cartridge includes a data storage medium and an electrical connection providing access to the data storage medium. The dongle includes a first plug and a second plug. The first plug includes a first electrical data connector configured for insertion into a receptacle of the host computing device. The second plug includes a second electrical data connector and a clamp mechanism sized to grasp a portion of the data storage cartridge to maintain the second electrical data connector in a position to communicate with the electrical connection of the data storage cartridge. The second plug is in electrical communication with the first plug. As such, the dongle is configured to provide an electrical communication link between the host device and the data storage cartridge.

20 Claims, 4 Drawing Sheets

DONGLE CONFIGURED TO ELECTRICALLY COUPLE A DATA STORAGE DEVICE AND A HOST COMPUTING DEVICE

BACKGROUND OF THE INVENTION

Data storage cartridges have been used for decades in the computer, audio, and video fields as means for storing data files. Due to a desire for true random access to individual files stored within the data storage cartridges, data storage cartridges utilizing non-magnetic tape forms of data recording media have developed. In particular, data storage cartridges using hard disk drive data storage have increased in availability and popularity.

The data storage cartridges using hard disk drives or other non-tape data storage media not only provide for true random access to data stored therein, but also increase accessibility to the data stored therein. More specifically, the non-tape data storage cartridges allow for access to data therein with an electrical connection and associated circuitry without the need for spools, drive hubs, or other relatively complicated mechanical devices that are generally required for access magnetic tape storage media. However, by decreasing the mechanics used to access data, additional uses for the data storage cartridges can be realized. For example, an individual user can access data on a non-tape data storage cartridge using a desktop docking system.

Conventional desktop docking systems include a socket for at least partially receiving and surrounding the housing of the non-tape data storage cartridges. Since the docking station is sized to at least partially receive and encompass the housing, docking stations generally are sized to require a desktop footprint larger than the size of the data storage cartridges themselves. Furthermore, the size of conventional docking system render the docking system fairly bulky such that the docking systems discourage the regular transport thereof by general business or other travelers.

For at least the above-described reasons, it would be desirable to create a device for easily accessing data stored in non-tape data storage cartridges that can be easily transported and/or that has a relatively small desktop footprint.

SUMMARY OF THE INVENTION

One aspect of the present invention relates to a dongle for coupling a data storage cartridge with a host computing device. The data storage cartridge includes a data storage medium and an electrical connection providing access to the data storage medium. The dongle includes a first plug and a second plug. The first plug includes a first electrical data connector configured for insertion into a receptacle of the host computing device. The second plug includes a second electrical data connector and a clamp mechanism sized to grasp a portion of the data storage cartridge to maintain the second electrical data connector in a position to communicate with the electrical connection of the data storage cartridge. The second plug is in electrical communication with the first plug. As such, the dongle is configured to provide an electrical communication link between the host device and the data storage cartridge. Other dongles and associated systems are also disclosed.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., is used with reference to the orientation of the Figure(s) being described. Because components of embodiments described herein can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
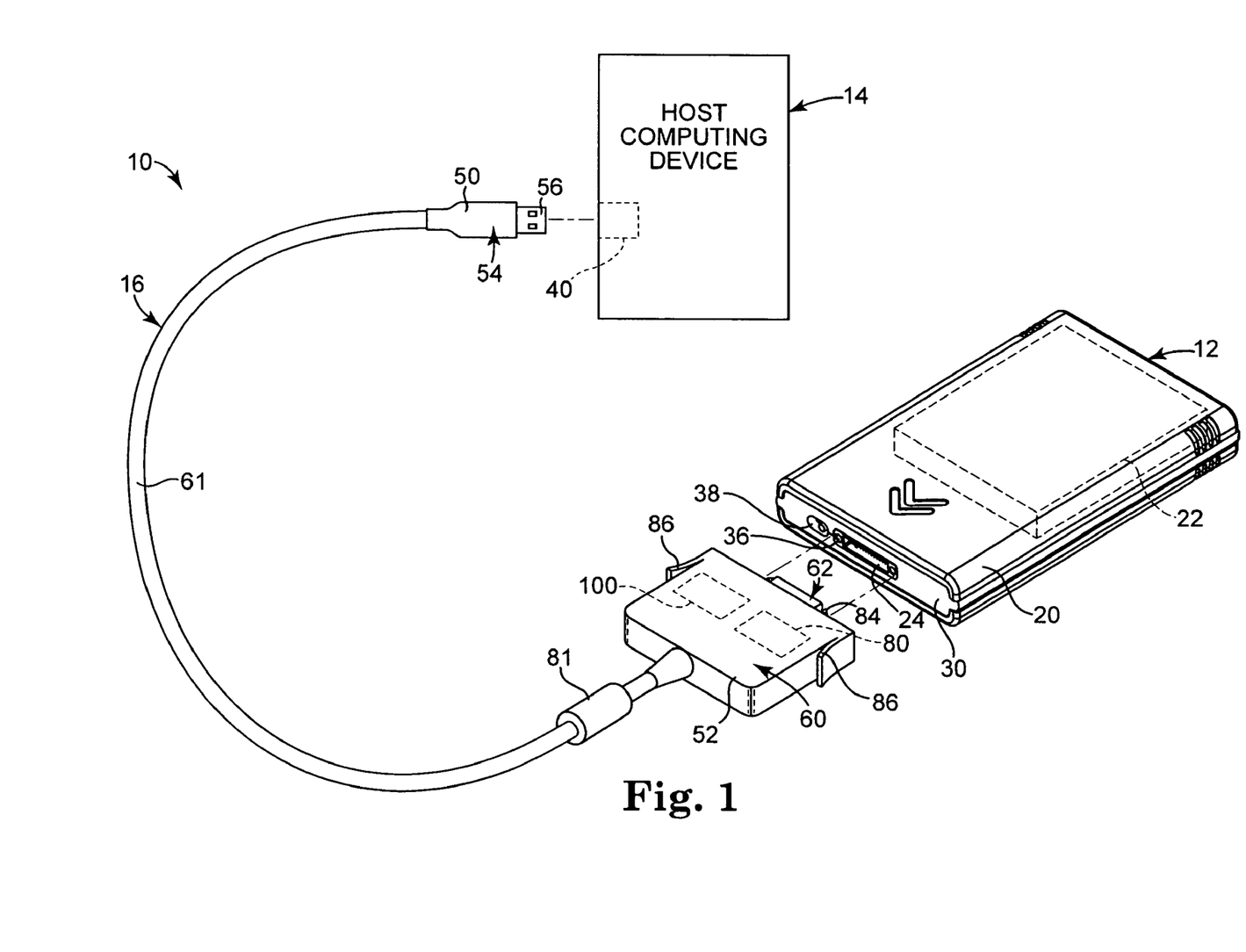
FIG. 1 is a schematic illustration of one embodiment of a data storage and access system.

FIG. 1 generally illustrates a data storage and access system 10 including a data storage cartridge 12, a host computing device 14 (schematically indicated in FIG. 1), and a dongle 16. The dongle 16 is configured to be selectively coupled with each of the data storage cartridge 12 and the host computing device 14 to facilitate communication and data transfer therebetween, such that the dongle 16 provides an alternative to conventional data storage cartridge docking stations (not shown). Conventional docking stations generally have a relatively large desktop footprint and/or have a relatively large overall size that discourages the regular transport of conventional docking stations. The dongle 16, on the other handle, is relatively small and easily transportable within a briefcase or other suitable carrying case and utilizes little to no desktop space as compared to conventional data storage docking stations.

In one embodiment, the data storage cartridge 12 includes a housing 20, a data storage medium 22 enclosed therein, and an externally accessible electrical data connector 24 to facilitate communication with the data storage medium 22. In one embodiment, the data storage medium 22 takes any suitable form and includes one or more of a variety of storage media such as a disk-shaped magnetic storage medium, a solid-state storage medium, an optical storage medium, a magneto-optical storage medium, and a holographic storage medium. The solid state storage medium may be any non-volatile memory such as an erasable programmable read-only memory (EPROM), an electrically erasable programmable memories (FLASH) memory, or the like. In a preferred embodiment, the non-tape data storage medium includes a random access storage medium, such as a hard disk drive.

Figure 2:
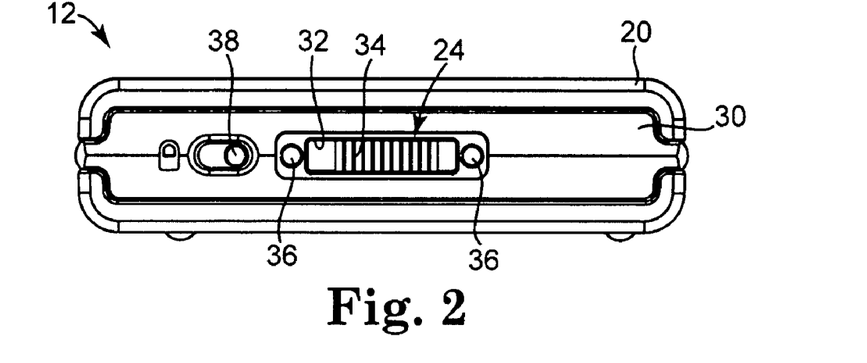
FIG. 2 is a side view illustration of one embodiment of a first end of a data storage cartridge used with the system of FIG. 1.

FIG. 2 illustrates a connection end 30 of one embodiment of the data storage cartridge 12 including the electrical data connector 24. In one embodiment, the housing 20 includes an opening 32, which provides access to the electrical data connector 24 otherwise enclosed within the housing 20. The data connector 24 may be any suitable connector configured to provide access to the data storage medium 22. In one embodiment, the data connector 24 is a serial connector (e.g., a Serial Advanced Technology Attachment (SATA)), parallel connector, Universal Serial Bus (USB) connector, or any other suitable connector, for example, a connector including a connection assembly with electrical contacts as described in U.S. patent application Ser. No. 11/502,254 filed Aug. 9, 2006, and entitled "Data Storage with Non-Tape Data Storage Medium and Electrical Contacts," the contents of which are incorporated by reference herein. In one instance, the data connector 24 includes a plurality of electrical targets 34, such as conductive pads in electrical communication with the data storage medium 22, for example, where the data storage medium 22 is a hard disk drive. In one embodiment, the data storage cartridge 12 is similar to the Odyssey™ hard disk drive cartridge, available from Imation Corp. of Oakdale, Minn. Use of other data storage cartridges 12 is also contemplated.

In one embodiment, the data storage cartridge 12 may additionally include one or more features such as one or more alignment apertures 36, a write protect indicator 38, etc. Alignment apertures 36 are configured to provide for general alignment of the data storage cartridge 12, more particularly, of the data connector 24, and a docking station, drive, or other access device, such as the dongle 16. In one example, at least one of the alignment apertures 36 is formed on either side of the data connector 24.

The write protect indicator 38 is any suitable indicator configured to indicate whether the data contents of the data storage medium 22 are write protected, or in other words, whether or not new data can or should be written to the data storage medium 22. In one example, the write protect indicator 38 is a switch, which is selectively movable between at least a first and a second position. The first position indicates that the data storage medium 22 is write protected (i.e., that no new data should be written to the data storage medium 22), and the second position indicates that the data storage medium 22 is not write protected (i.e., that new data can and is allowed to be written to the data storage medium 22). Other suitable write protect indicators are also contemplated such an indicator light, etc. In one embodiment, each of the data connector 24, the alignment apertures 36, and the write protect indicator 38 are in substantially transverse linear alignment with one another across the connection end 30 of the data storage cartridge 12.

The host computing device 14 is any suitable computing device as will be apparent to those of skill in the art upon reading this application. In one embodiment, the host computing device 14 is a stand-alone computing unit; while, in another embodiment, the host computing device 14 is a network drive such that the dongle 16 can be plugged therein to collectively function as a networked drive(s) accessible by multiple users, etc. The host computing device 14 includes at least one electrical connection port 40 configured to interface with suitable peripheral devices such as the dongle 16, as will be further described below. In one embodiment, the electrical connection port 40 provides a suitable standardized data port such that a general host computing device 14 can be used with the dongle 16 even where the host computing device 14 was not specifically configured for use with the dongle 16. For example, the at least one electrical connection port 40 is configured to communicate with peripherals using one of a serial (e.g., SATA), parallel, USB, IEEE 1394 interface (e.g., a FireWire® interface available from Apple Inc. of Cupertino, Calif.), or other suitable connection and associated communication protocol.

Notably, the term "dongle" as used herein should be accorded a broad meaning and should apply at least to a device that has a first connector that may be connected to a host computing device, such as a serial port, parallel port, USB port, etc., and has a second connector configured to be coupled with a data storage cartridge 12. Dongles may be enclosed within a single housing or may be formed with separate housings or plug bodies coupled to one another with a cable or similar device. Referring back to FIG. 1, in one embodiment, the dongle 16 includes a first or host interface 50 and a second or cartridge interface 52. Host interface 50 is configured to interface and communicate with the host computing device 14. For example, host interface 50 includes a host interface plug 54 (e.g., a first plug of the dongle 16) including at least a portion 56 thereof configured to be received within the connection port 40 of the host computing device 14. The host interface plug 54 may be any suitable plug and, in one embodiment, is a USB plug configured to communicate with the host computing device 14 using standard USB communication protocol.

In one example, the cartridge interface 52 includes a cartridge interface plug 60 (e.g., a second plug of the dongle 16) configured to interface and communicate with the data storage cartridge 12. In one instance, the host interface plug 54 and the cartridge interface plug 60 are coupled to one another with a flexible cable 61 or other suitable member(s) providing for electrical communication therebetween. The flexibility of the cable 61 further allows the dongle 16 to be rolled or other manipulated into an even smaller space such that the transport of the dongle 16 can be further simplified. One embodiment of the cartridge interface plug 60 is more particularly illustrated with additional reference to FIGS. 3 and 4. For example, cartridge interface plug 60 includes an electrical connector 62 extending from a general housing or body 64. The electrical connector 62 is configured to electrically interface with the data connector 24 of the data storage cartridge 12. For instance, where the electrical connector 24 of the data storage cartridge includes a male or female SATA connector, the cartridge interface plug 60 includes the corresponding other of the male or female SATA connector.

In one embodiment, for example, where the data connector 24 of the data storage cartridge 12 includes a connection assembly with electrical contacts as described in U.S. patent application Ser. No. 11/502,254 filed Aug. 9, 2006 and entitled "Data Storage Cartridge with Hard Drive and Electrical Targets," the contents of which are incorporated by reference herein, the electrical connector 62 includes a plurality of connection pins 70 each configured to interface with a corresponding one of the plurality of electrical targets 34 (FIG. 2) of the data storage cartridge 12. As such, the connection pins 70 collectively provide for means for electrically accessing the data storage medium 22 via the data connector 24.

Figure 3:
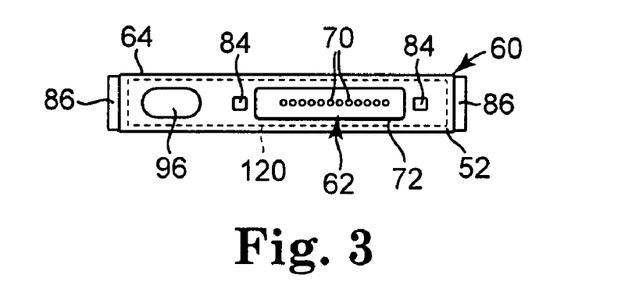
FIG. 3 is a side view illustration of a cartridge interface plug used with the system of FIG. 1.
Figure 4:
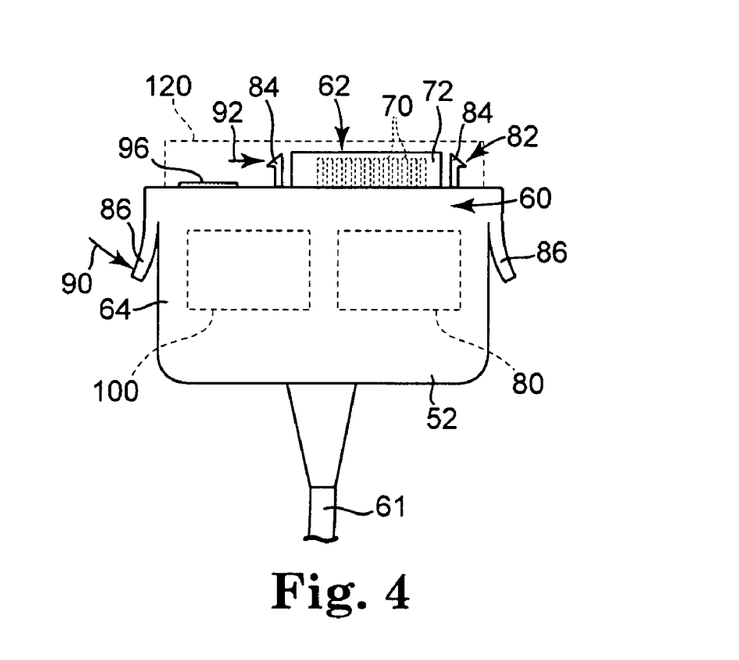
FIG. 4 is a top view illustration of the cartridge interface plug of FIG. 3.

In one example, the connection pins 70 are compliant pins. One example of a suitable compliant pin 196 is described in U.S. patent application Ser. No. 10/928,486 filed on Aug. 27, 2004, and entitled "Electronic Data Connector of Data Storage Cartridge and Associated Cartridge Drive," which is hereby incorporated by reference. In such an embodiment, each of the connection pins 70 is coated with a conductive metal, such as gold, beryllium, copper, or tool steel, and defines a round or otherwise styled contact tip for compliantly contacting one of the plurality of targets 34. In one embodiment, each connection pin 70 is a POGO® pin available from Everett Charles Technologies of Pomona, Calif.

In one embodiment, each connection pin 70 is configured to transversely contact one of the plurality of electrical targets 34 (e.g., each connection pin 70 interfaces with a surface of a corresponding one of the plurality of electrical targets 34 with an orientation substantially perpendicular thereto). For instance, where the data storage cartridge 12 includes ten linearly arranged targets 34 as illustrated in FIG. 2, the electrical connector 62 includes ten complimentary, linearly arranged connection pins 70. Accordingly, the size, spacing, and arrangement of the connection pins 70 can be altered as desired based on the size, spacing, and arrangement of the plurality of electrical targets 34 and/or specific mechanical tolerances of the data storage cartridge 12.

In one embodiment, the cartridge interface plug 60 includes a rim or other suitable guard 72 extending away from the body 64 around the connection pins 70 to protect the connection pins 70 from bending, breaking, or otherwise being transversely impacted or altered. In one example, the guard 72 has an outer perimeter similarly shaped and sized slightly smaller than the opening 32 in data storage cartridge 12 such that the guard 72 fits within opening 32. The guard 72 may be at least partially retractable, such that as the cartridge interface plug 60 is placed into communication with the data storage cartridge 12, the guard 72 retracts back partially into the body 64 to further expose the connection pins 70.

In one embodiment, the electrical connector 62 of the dongle 16 is configured to communicate with the data storage cartridge 12 using a first protocol, while the host interface plug 54 of the dongle 16 is configured to communicate with the host computing device 14 using a second protocol. For instance, the electrical connector 62 may be configured for SATA communication with the data storage cartridge 12 while the host interface plug 54 is configured to communicate with the host computing device 14 using USB protocol. In such embodiments, the dongle 16 is not only configured to act as a conduit for data communication between the data storage cartridge 12 and the host computing device 14, but is also configured to operate in accordance with particular protocols of each of the data storage cartridge 12 and the host computing device 14. As such, regardless of the type of data connector 24 included on the data storage cartridge 12, the dongle 16 is adapted to reconfigure the data communicated therefrom into a format consistent with that expected by the host computing device 14.

For example, the dongle 16, more particularly, the cartridge interface plug 60, includes and encloses a controller 80 (schematically indicated in dashed lines in FIG. 4) configured to receive data or other communications in the first protocol and to convert such data and/or communications to the second protocol and vice versa. As such, the controller 80 acts as an interpreter of sorts. The protocol converter may be any suitable converter such as an integrated circuit and/or a PHY chip, for example, the Semiconductor 921 offered by Oxford Semiconductor, Inc., of Milpitas, Calif. In one embodiment, the controller 80 is positioned in the dongle 16 in a position other than within the body 64. For example, the controller 80 may be positioned in an auxiliary body 81 of the dongle 16.

Figure 5:
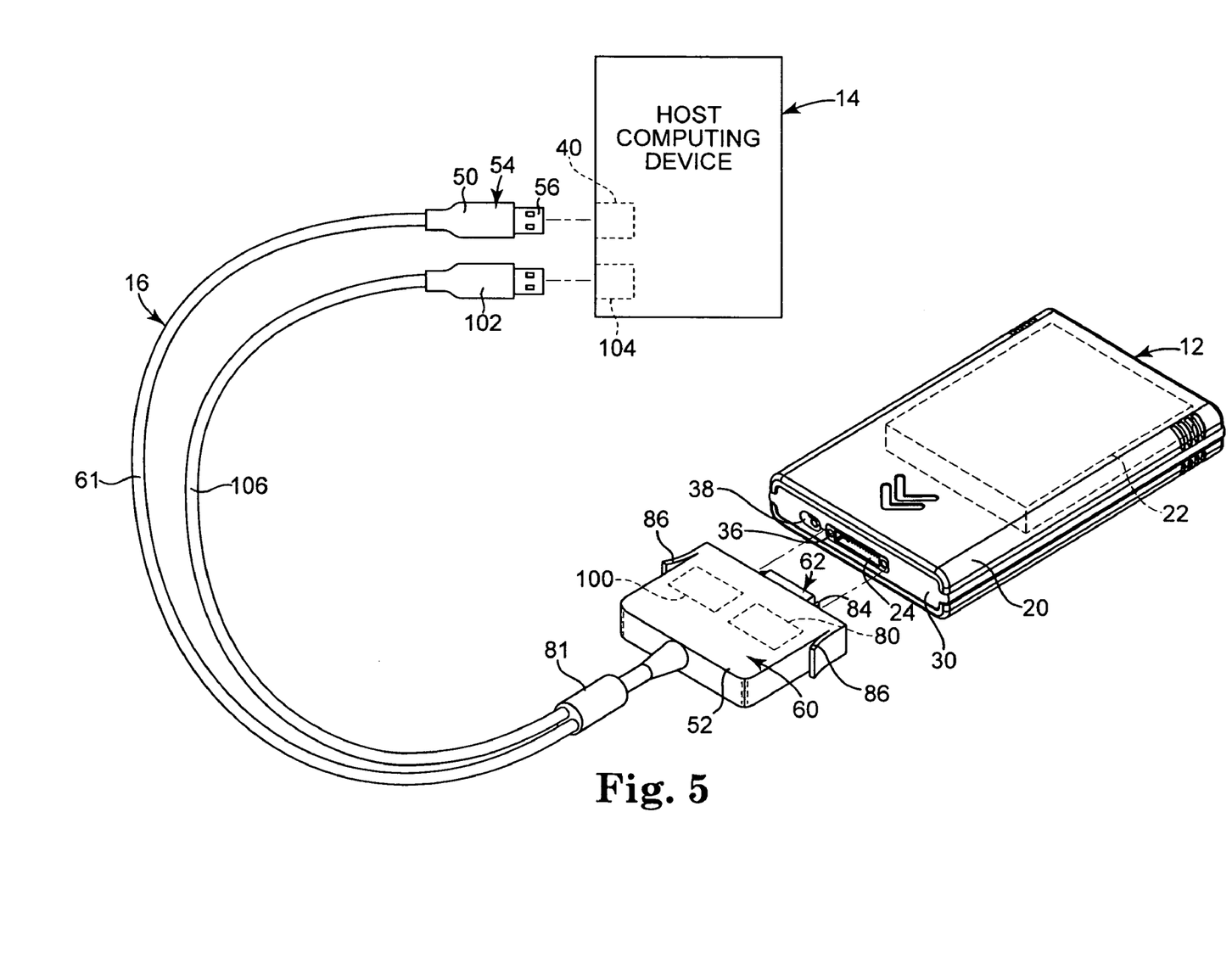
FIG. 5 is a schematic illustration of one embodiment of a data storage and access system.

The cartridge interface plug 60 may be powered solely by the connection between the host computing device 14 and the host interface plug 54 (such as via a USB connection). However, in one embodiment, as illustrated with reference to FIG. 5, a second host interface plug 102, similar to the host interface plug 54 is provided to supply additional power to the dongle 16 and/or to provide for faster data flow between the host computing device 14 and the data storage cartridge 12.

Where the second host interface plug 102 is provided, the host computing device 14 includes a second electrical connection port 104 similar to the port 40 configured to receive the second host interface plug 102. The second host interface plug 102 may be coupled with the cartridge interface plug 60 with a second cable 106 or in any other suitable manner. In one example, the second host interface plug 102 facilitates powering the data storage cartridge 12, such as a hard disk drive or other data storage medium 22 contained therein, to allow access to the data storage medium 22 to read data from and/or to write data to the data storage medium 22.

Figure 6:
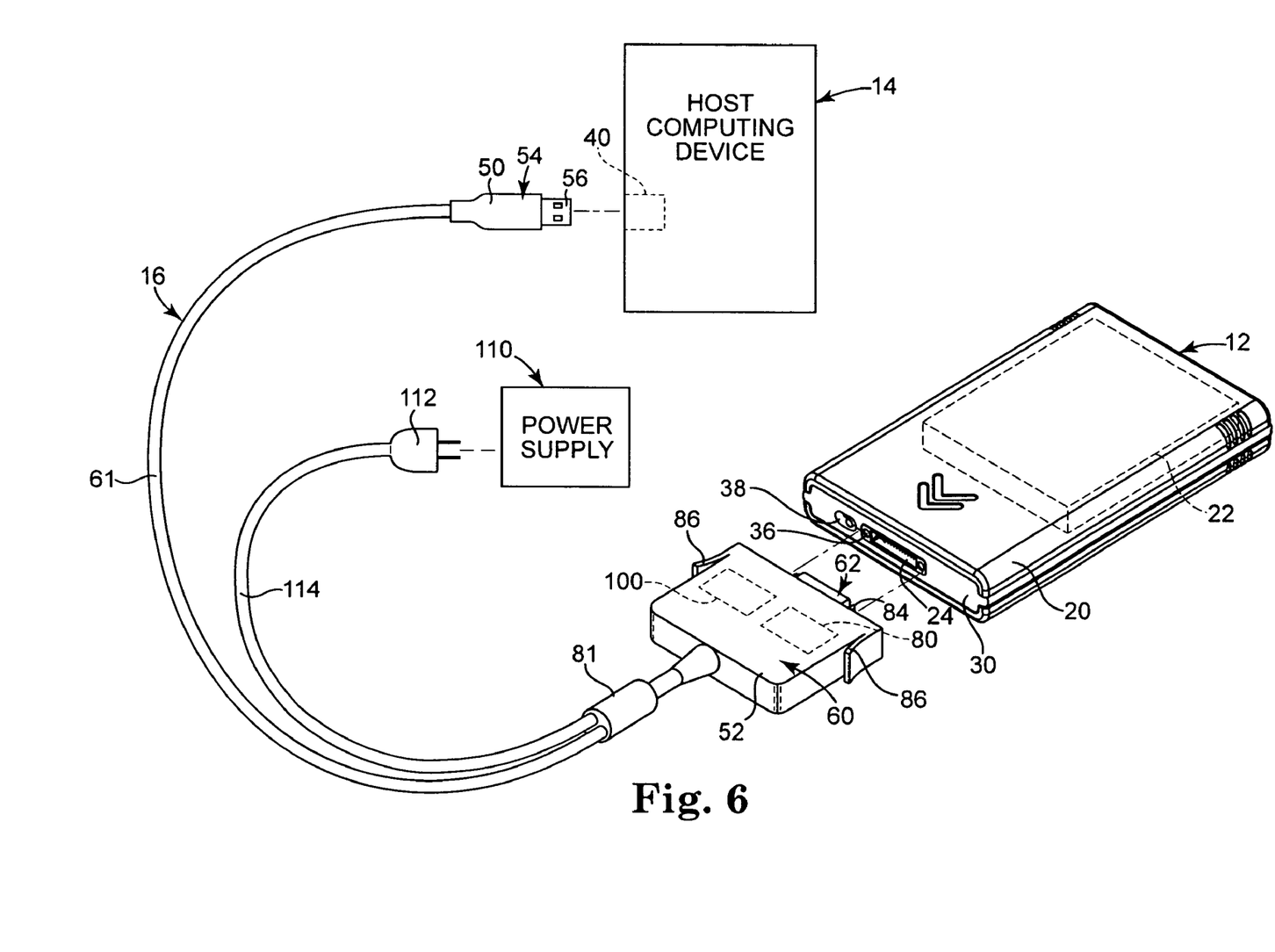
FIG. 6 is a schematic illustration of one embodiment of a data storage and access system.

In one embodiment, the dongle 16 includes an additional or alternative power source, for example, to facilitate powering and access to the data storage medium 22 maintained within the data storage cartridge 12. For instance, as schematically illustrated in FIGS. 1 and 4, the dongle 16 may include a battery or other internal power supply 100 within the body 64 of the cartridge interface plug 60 or otherwise positioned within the dongle 16, such as in the auxiliary body 81. In one embodiment, as illustrated in FIG. 6, an external power supply 110 is provided in addition to or as an alternative to the second host interface plug 102 (FIG. 5) and/or the battery 100 (FIG. 1). In such an embodiment, the dongle 16 additionally includes a power supply plug 112 configured to interact with the external power supply 110 to provide additional power to the dongle 16. The power supply plug 112 may be coupled with the rest of the dongle 16 in any suitable manner, for example, via a second cable 114.

The body 64 generally defines the overall shape of the cartridge interface plug 60 and provides for user handling of the cartridge interface plug 60. In one embodiment, the body 64 also includes a clamp mechanism 82 configured to selectively interface with, more specifically, grasp, the data storage cartridge 12 to couple the cartridge interface plug 60 with the data storage cartridge 12. In one example, the clamp mechanism 82 includes one or more tabs 84 (e.g., protrusions, hooks, latches, etc.) extending from the body 64 in a similar direction as the connection pins 70 extend therefrom. Each of the tabs 84 is configured to interface with and to be selectively coupled to the data storage cartridge 12. In one embodiment, one of the tabs 84 is positioned on each side of the electrical connector 62, and each of the tabs 84 is configured to align with and be received by an alignment aperture 36 (FIG. 2) of the data storage cartridge 12. The tabs 84 may take any suitable form, for example, as hooks extending away from one another as illustrated in FIG. 4. In one example, each of the tabs 84 is at least partially compliant or otherwise moveable such that the tabs 84 can be moved between a secure position and a release position. In one instance, the tabs 84 are biased in the secure position.

To facilitate moving each of the tabs 84 between the respective secure and release positions, in one embodiment, the clamp mechanism 82 additionally includes actuation members 86 extending along opposing sides of the body 64. Each actuation member 86 mechanically communicates with a corresponding one of the tabs 84 such that depression of the actuation members 86, for example, as generally indicated by arrow 90, causes the bias of each of the tabs 84 to be overcome and to at least slightly move at least a free end of each of the tabs 84 inward (e.g., toward each other) as generally indicated by arrow 92 in FIG. 4. Such movement is configured to facilitate coupling of the cartridge interface plug 60 with the data storage cartridge 12.

More specifically, when the actuation members 86 are depressed and the tabs 84 are in the release position, the tabs 84 can be easily slid into and out of the corresponding alignment apertures 36 of the data storage cartridge 12. However, when the actuation members 86 are released, the bias of the tabs 84 causes the tabs 84 to move at least slightly in the opposite direction as indicated by arrow 92 such that the hook ends of the tabs 84 grasp the edges of the alignment apertures 36. Due to this interaction between the tabs 84 and the data storage cartridge 12, the tabs 84 cannot be easily slid into and/or removed from the alignment apertures 36. When the tabs 84 are received by the alignment apertures 36 and the tabs 84 are in a secure position, the connection pins 70 are maintained in a position interfacing with the targets 34 of the data storage cartridge 12 such that the host computing device 14 can communicate with the data storage medium 22 of the data storage cartridge 12 via the dongle 16.

In one embodiment, the dongle 16 includes a write protect detector 96. In one example, the write protect detector 96 is positioned on the cartridge interface plug 60 to align with the write protector indicator 38 of the data storage cartridge 12 when the data storage cartridge 12 is coupled with the dongle 16. The write protect detector 96 is any suitable mechanism such as a sensor, switch, etc., configured to interact with or otherwise read the position of the write protector indicator 38 of the data storage cartridge 12 such that the host computing device 14, and accordingly, any user associated therewith, can be informed as to the write protect status of the data storage cartridge 12, which in turn can be used to decrease accidental overwrite of write protected data storage cartridges 12.

Other modifications, constructions, etc., of the dongle 16 described herein will be apparent to those of skill in the art upon reading this application. For example, in one embodiment, an retractable guard as generally indicated with dashed lines 120 in FIG. 4 may be added to the cartridge interface plug 60 to surround and protect the components (e.g., the connection pins 70, the tabs 84, the write protect detector 96) from transverse impact and may be used as a replacement for or as an additional guard with the guard 72 described above.

Use of the dongle 16 as described above includes coupling the dongle 16 with each of the data storage cartridge 12 and the host computing device 14. More specifically, in one embodiment, the actuation members 86 are moved in the direction of arrow 90 to position the tabs 84 in a release position. While the tabs 86 are in the release position, the cartridge interface plug 60 is moved toward the connection end 30 of the data storage cartridge 12 such that tabs 86 are each received by a corresponding alignment aperture 36 of the data storage cartridge 12. Subsequently, the actuation members 86 are released and the tabs 86 transition to a secure position, which thereby couples the data storage cartridge 12 to the dongle 16. Notably, when the data storage cartridge 12 is coupled to the dongle 16, the data connector 24 and the electrical connector 62 are electrically coupled to one another.

In addition, the host interface plug 54 is coupled with the host computing device 14, more specifically, is received within the connection port 40 of the host computing device 14. Once the host interface plug 54 is so received and the data storage cartridge 12 is coupled to the cartridge interface plug 60, the host computing device 14 can read/write data to and/or otherwise communicate with the data storage medium 22 of the data storage cartridge via the dongle 16. Further, where the data storage cartridge 12 is configured to communicate via a first protocol (i.e., is configured for a first type of data connector 24) and the connection port 40 is configured to communicate in a second, different protocol (i.e., is configured to receive a host interface plug 54 of a second type different from the first type), the dongle 16 is configured to translate the communication signals sent between the host computing device 14 and the data storage cartridge 12. In one embodiment, such arrangement allows a data storage cartridge 12 with a SATA type connection to communicate with a host computing device 14 having a USB type connection port 40.

The dongle 16 may also be coupled to the power supply 110 (e.g., with a power supply plug 112 as illustrated in FIG. 6), additionally coupled to the host computing device 14 (e.g., with a second host interface plug 102 as illustrated in FIG. 5), and or other provide power to the data storage cartridge 12 to facilitate access to the data storage medium 22 stored therein. For example, the additional power may be used to drive the data storage medium 22 where the data storage medium is a hard disk drive. In one embodiment, the dongle 12 is further configured to communicate the write protect status of the data storage cartridge 12 to the host computing device 14 via the write protect detector 96, which automatically aligns with the write protect indicator 38 when the cartridge interface plug 60 is coupled with the data storage cartridge.

When a user has completed the desired use of the data storage cartridge 12, the dongle 16 is easily removed from one or both of the data storage cartridge 12 and the host computing device 14 (as well as any external power supply 110 where applicable) for storage and/or transport and/or to be coupled with another data storage cartridge 12 and/or another host computing device 14 for additional use. In one embodiment, in order to uncouple the dongle 16 from the data storage cartridge 12, the actuation members 86 of the cartridge interface plug 60 are depressed (moved as generally indicated by arrow 90 in FIG. 4) to move tabs 84 to a release position. When the tabs 84 are in the release position, the tabs 84 are easily slid out of the corresponding alignment apertures 36. The sliding movement of the data storage cartridge 12 relative to the cartridge interface plug 60 (or vice versa) also decouples the data connector 24 from the electrical connector 72.

Dongles, as a described above, each provide a communication link between a host computing device and a data storage cartridge. The dongles are selectively couplable with each of the host computing device and the data storage cartridge such that the dongle can be selectively used with any one of a plurality of data storage cartridges as well as any one of a plurality of host computing devices. In one embodiment, dongles according to the present invention allow for a plurality of host computing devices each having a different type of connection port to all commutate with, read data from, and/or write data to the same data storage cartridge. For example, a first host computing device with a USB connection port using a first dongle with a USB host interface plug can read/write to a first data storage cartridge while a second host computing device with an IEEE 1394 connection port using a second dongle with an IEEE 1394 host interface plug can read/write to the same first data storage cartridge.

In one embodiment, a single dongle is provided having multiple host interface plugs (for example, plugs 54 and 102) each being of a different connection/protocol type such that the single dongle can be used with more than one of a USB connection port, a SATA-based connection port, and an IEEE 1394 connection port, etc. Accordingly, in such an embodiment, controller 80 is configured to facilitate communication based on more than one protocol. Examples of suitable controllers 80 include the Oxford semiconductor 924 chip (offered by Oxford Semiconductor, Inc.), which is configured to facilitate communication using IEEE 1394 and USB protocols, and the Oxford semiconductor 931 chip (offered by Oxford Semiconductor, Inc.), which is configured to facilitate communication using external SATA (eSATA) and USB protocols, with the first plug 60 being configured to communicate with the cartridge 12 using a SATA communication protocol. Other suitable controllers 80 will be apparent to those of skill in the art upon reading the present application.

In one embodiment, the dongle is formed with plugs and is characterized as not receiving or enclosing the data storage cartridge such that the dongle is relatively small as compared to conventional docking stations. The small and/or flexible nature of the dongles contributes to the ease of transporting or otherwise storing the dongles described above. In one embodiment, such dongles also provide for a desirable back-up method of communicating with the data storage cartridges in instances where a conventional docking station is defective or otherwise temporarily unavailable for use.

Although specific embodiments have been illustrated and described herein, it will be appreciated by those of ordinary skill in the art that a variety of alternate and/or equivalent implementations may be substituted for the specific embodiments shown and described without departing from the scope of the present invention. For example, the host computing device interface 50 and the cartridge interface 52 may both be provided within a single dongle housing. This application is intended to cover any adaptations or variations of the specific embodiments discussed herein. Therefore, it is intended that this invention be limited only by the claims and the equivalents thereof.

What is claimed is:

1. A dongle for coupling a data storage cartridge, which includes a data storage medium and an electrical connection providing access to the data storage medium, with a host computing device, the dongle comprising:
   a first plug including a first electrical data connector configured for insertion into a connection port of the host computing device; and
   a second plug including a second electrical data connector and a clamp mechanism sized to grasp a portion of the data storage cartridge to maintain the second electrical data connector in a position to communicate with the electrical connection of the data storage cartridge, the second plug being in electrical communication with the first plug and comprising a write protect detector configured to determine if the data storage cartridge is write protected;
   wherein the dongle is configured to provide an electrical communication link between the host device and the data storage cartridge.

2. The dongle of claim 1, further comprising a cable extending between and electrically coupling the first plug and the second plug.

3. The dongle of claim 1, further comprising a controller configured to convert data received from the data storage cartridge via the second plug in a first protocol into a second protocol to be sent to the host computing device via the first plug, wherein the second protocol is different from the first protocol.

4. The dongle of claim 1, wherein the data storage cartridge includes an alignment aperture, and the clamp mechanism comprises a hooked tab positioned to be received by the alignment aperture and to grasp the data storage cartridge to couple the second plug with the data storage cartridge.

5. The dongle of claim 1, wherein the write protect detector is configured to align with a write protect indicator on the data storage cartridge when the second electrical data connector of the second plug is in communication with the electrical connection of the data storage cartridge.

6. The dongle of claim 1, wherein the data storage medium of the data storage cartridge includes a hard disk drive, the dongle being configured to power the hard disk drive to one or more of access data stored on the hard disk drive and write data to the hard disk drive.

7. The dongle of claim 1, further comprising means for providing power to the dongle to facilitate access to the data storage medium of the data storage cartridge.

8. The dongle of claim 1, wherein the second electrical connector includes a plurality of compliant pins each configured to transversely interact with a corresponding electrical target of the electrical connection of the data storage cartridge.

9. The dongle of claim 1, further comprising a third plug including a third electrical data connector configured to interface with the host computing device, wherein the first plug and the third plug are each configured to communicate using a different communication protocol.

10. The dongle of claim 3, wherein the first protocol is SATA-based.

11. The dongle of claim 4, wherein the hooked tab is configured to move between a secure position, in which the hooked tab is configured to grasp the data storage cartridge, and a release position, in which the hooked tab is configured to freely move into and out of the alignment aperture of the data storage cartridge, and the second plug further comprises an actuation member mechanically coupled with the hooked tab such that movement of the actuation member causes the hook tab to move between the secure position and the release position.

12. The dongle of claim 7, wherein the connection port of the host computing device is a first connection port, and the means for providing power includes a third plug including a third electrical data connector configured for insertion into a second connection port of the host computing device.

13. The dongle of claim 7, wherein the means for providing power includes an internal power supply.

14. The dongle of claim 7, wherein the means for providing power includes a third plug configured to interact with an external power supply, such that the dongle receives power from the external power supply via the third plug.

15. The dongle of claim 10, wherein the second protocol is USB-based.

16. A dongle for coupling a data storage cartridge, which includes a non-tape data storage medium and an electrical connection providing access to the data storage medium, with a host computing device, the dongle comprising:
   means for electrically communicating with the host computing device in a first protocol;
   means for electrically interfacing with the data storage cartridge in a second protocol, where the first protocol is different from the second protocol, the means for electrically interfacing with the data storage cartridge comprising a write protect detector configured to determine if the data storage cartridge is write protected; and
   means for providing power to the dongle separate from the means for electrically communicating with the host computing device.

17. The dongle of claim 16, further comprising means for translating, including one or more of means for translating data received from the host computing device in the first protocol into the second protocol for storage to the data storage cartridge and means for translating data received from the data storage cartridge in the second protocol into the first protocol for communication to the host computing device.

18. The dongle of claim 16, further comprising means for securing the dongle to the data storage cartridge such that the means for electrically interfacing with the data storage cartridge are positioned to electrically communicate with the data storage cartridge, wherein the means for securing the dongle is separate from the means for electrically interfacing with the data storage cartridge.

19. A data storage system for use with a host computing device, the data storage system comprising:
    a data storage cartridge including:
        a data storage medium, and
        an electrical connection providing access to the data storage medium, the data storage cartridge defining at least one alignment aperture; and
    a dongle including:
        a first plug including a first electrical data connector configured for insertion into a connection port of the host computing device, and
        a second plug including a second electrical data connector and a clamp mechanism comprising an elongated projection configured for insertion into the at least one alignment aperture and sized to grasp a portion of the data storage cartridge to maintain the second electrical data connector in a position to communicate with the electrical connection of the data storage cartridge, the second plug being in electrical communication with the first plug;
    wherein the dongle is configured to provide an electrical communication link between the host device and the data storage cartridge.

20. The data storage system of claim 19, wherein the second plug comprises an actuation member mechanically coupled with the elongated projection such that movement of the actuation member causes the elongated projection to move between a secure position and a release position.

* * * * *